Dec. 7, 1965  T. A. BANNING, JR  3,222,452
PRE-PAY OR SUBSCRIPTION RADIO OR TELEVISION OPERATIONS
Original Filed July 16, 1956  10 Sheets-Sheet 1

Inventor:
Thomas A. Banning, Jr.

Inventor:
Thomas A. Banning, Jr.

Inventor:
Thomas A. Banning, Jr.

Inventor:
Thomas A. Banning, Jr.

Dec. 7, 1965 T. A. BANNING, JR 3,222,452
PRE-PAY OR SUBSCRIPTION RADIO OR TELEVISION OPERATIONS
Original Filed July 16, 1956 10 Sheets-Sheet 6

Inventor:
Thomas A. Banning, Jr.

Inventor:
Thomas A. Banning, Jr.

Inventor:
Thomas A. Banning, Jr.

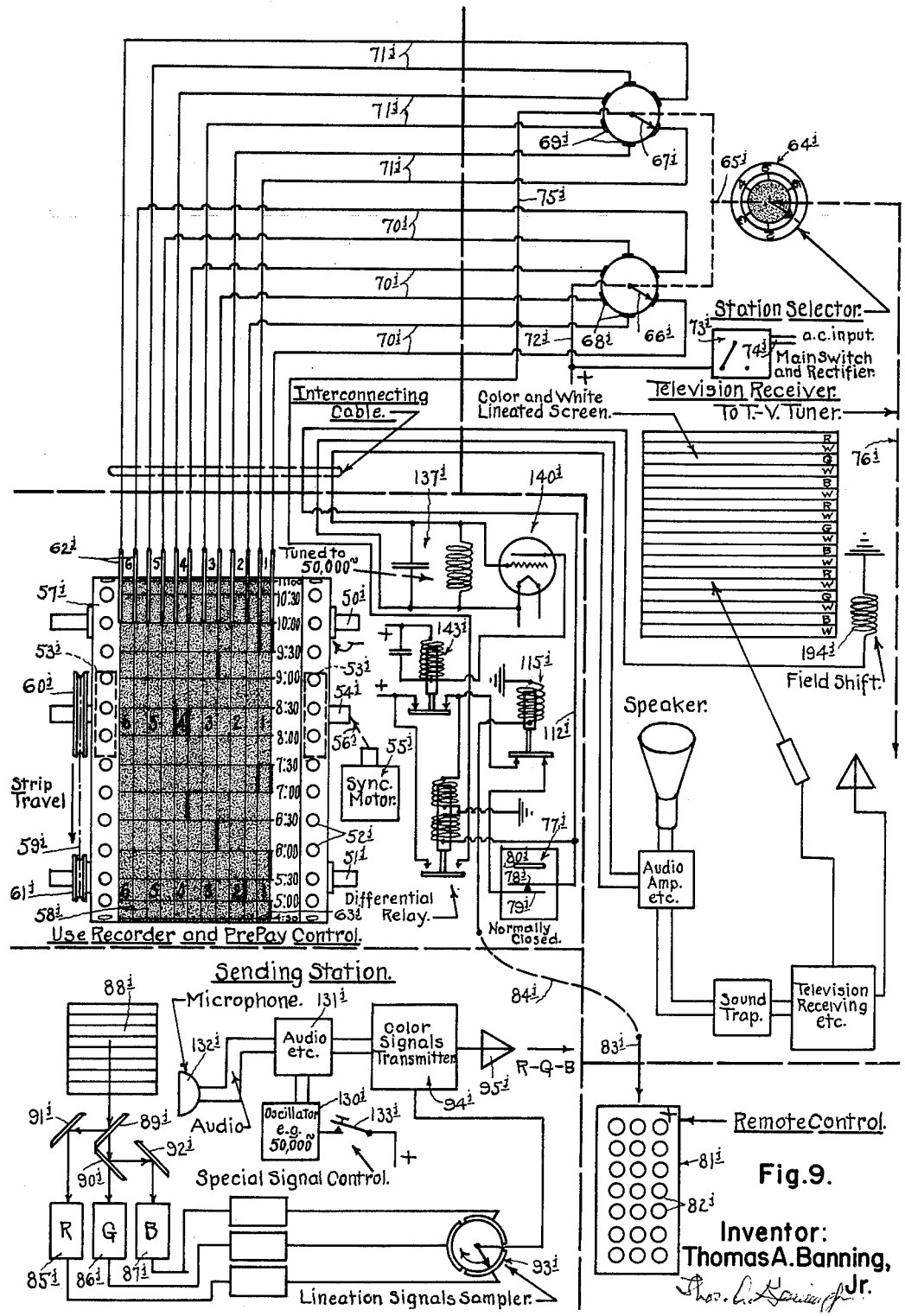

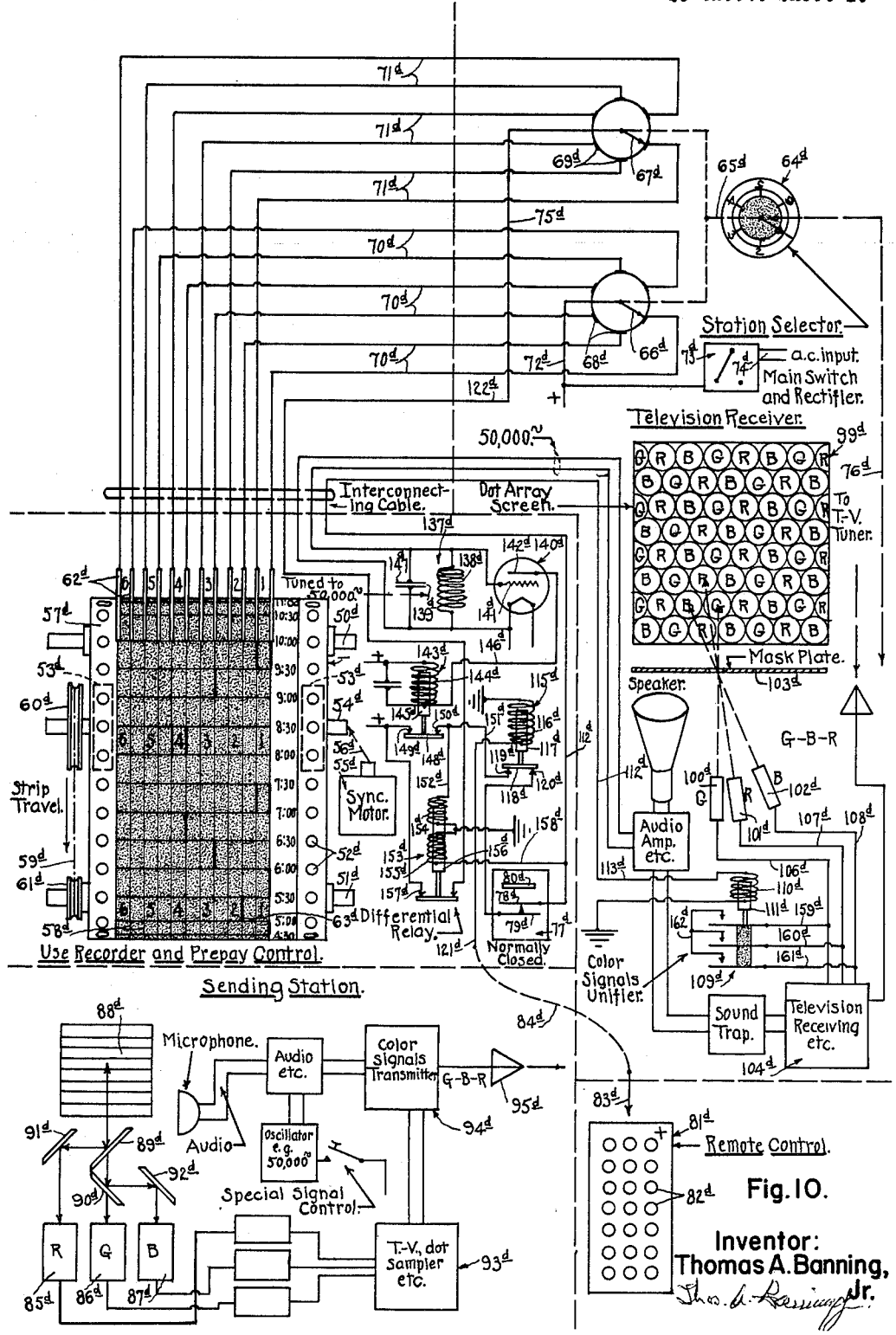

United States Patent Office 3,222,452
Patented Dec. 7, 1965

3,222,452
PRE-PAY OR SUBSCRIPTION RADIO OR
TELEVISION OPERATIONS
Thomas A. Banning, Jr., 5500–5520 S. Shore Drive,
Chicago, Ill.
Original application July 16, 1956, Ser. No. 597,950, now
Patent No. 3,070,652, dated Dec. 25, 1962. Divided
and this application Dec. 17, 1962, Ser. No. 245,277
7 Claims. (Cl. 178—5.2)

This application is a division of my copending application for patent on Improvements in Radio and Television Program Selecting, and Time of Use Recording, Serial No. 597,950 filed July 16th, 1956, and issued as Letters Patent No. 3,070,652, on December 25th, 1962. Said application, Serial No. 597,950 (now Patent No. 3,070,-652) was copending with my earlier application, Serial No. 235,854, filed July 9th, 1951, and issued July 17th, 1956 as Patent No. 2,755,334.

This invention relates to improvements in pay or subscription television, or the like. The disclosures hereinafter disclosed are intended primarily for use in connection with radio programs which are received in audio form; and such usage may be in connection with the reception of such audio programs when emitted as pure sound transmitting and receiving systems, or the reception of such sound transmitting and receiving systems incorporated into or used in connection with so-called television system. In either case, however, the features of the presently to be disclosed embodiment are constituted for the selection and control and recording of the sound portions of the intelligence so transmitted and translated. Therefore it will be understood that such disclosures and the claims based thereon are not limited to the selection and recording of so-called audio systems which are not incorporated with or used in connection with television transmission and translation, but may also be used or incorporated with system which also include the transmission and translation of television signals, except as I may limit myself in the claims as follow. Certain of the disclosures herein are also directed to the constructions by which either color reception and translation or monochrome translation and reception of received color signals, may be produced at the selection of the operator of the receiver.

One object of the invention relates to the provision of an audio signal transmitting and translating system incorporating means whereby the emitted signals may be received and intelligibly translated in either or both of two qualities of reception, one of which may be termed a "superior" quality reception and the other of which may be termed an "inferior" quality reception. The arrangement is, however such that when either such quality reception is being translated the translation will be of intelligible quality, and not "scrambled" or otherwise interfered with. Thus, the person receiving the translated program may choose which quality of reception he desires, suitable means being provided by the presently disclosed equipment to enable such choice to be made.

At the present time radio transmitting and translating systems for audio reception are known and widely used, wherein provision is made for transmission and reception and translation of programs in both of two systems, being the A.M. system and the F.M. system. Conventionally many persons accept the F.M. system as providing the superior means of transmission and translation, depending on various conditions of distance, atmospheric or static interference, and other conditions. Thus, according to such conventional equipment a choice is provided within the control of the listener since he can choose the one form of reception or the other as desired and available.

It may be desirable to make provision for ensuring payment by the user of the equipment for reception of the emitted program when such program is being emitted as a "superior" quality program, entitled to be of such quality or value as to emission and reception to qualify for a charge against the user of the equipment when listening to such "superior" quality program. I have herein made provision for making it possible to emit such "superior" quality program under the condition that payment shall be made for intelligible reception thereof by the user, either by such payment into a coin-box or other receptacle provided at the location of the receiving equipment, or by producing a record of the use of the receiving equipment during the time of such "superior" quality program at a properly equipped recording station such as a central program recording station. The arrangement in this simple form includes means to prevent reception of the "superior" quality program until such pre-payment or such program recording has been made, in the latter case at such central station. Upon the making of such pre-payment or the signalling to the central station that it is desired to listen to such "superior" quality program, proper circuitry is activated to enable the listener to translate and hear such "superior" quality program for its duration or for such time interval as has been pre-paid or notified to the central station.

Under proper conditions of transmission and otherwise such "superior" quality program may be emitted according to the F.M. system; but various features of the present invention are not limited to their application to such F.M. system of transmission and reception, but may alternatively be used when applied to systems of the A.M. type and characteristics. I have herein included a showing of and shall describe the application of such features to the F.M. system, as well as showings of other embodiments of my invention.

A further object and feature of the present invention relates to the provision of means whereby the program being emitted may be according to both of two systems (e.g., both the A.M. and the F.M. systems), the "superior" quality being that emission and reception according to one of such systems (e.g., the F.M. system); the means provided by the present disclosures being such that reception and intelligible translation may be made on the "inferior" quality reception without need of pre-pay or the recording operations at the central station, whereas the reception according to the "superior" quality can be intelligibly made and translated only when proper pre-pay or the proper signalling to the central station has been made. By this arrangement the user of the receiving equipment is enabled to receive the program in any case without pre-pay or central station recording of his use, but on the "inferior" quality of reception. The presently disclosed equipment just referred to is such that when tuning the receiver to a selected emitting station which is emitting according to both the F.M. and A.M. systems, such program can be intelligibly received according to either of such systems, depending on the position of the "selector" switch which is provided in the equipment, provided that such program is not being emitted as a pre-pay or recorder controlled program requiring payment therefor. But such equipment is constituted so that when such program is being emitted as a "superior" quality program, the reception can be made on the A.M. system without pre-pay or obligation to make payment, but can be intelligibly received on the F.M. system only when the pre-pay has been made or the proper recording for future payment has been produced.

A further feature and object of the invention relates to the provision of operational signal control means comprising a portion of the receiving and translating equipment, and constituted to either pass an operational signal in such receiving and translating equipment or to completely block passage of such operational signal. There is also provided a control signal response element constituted to respond to a control signal emitted from a sending station, and connections between said control signal response element and the operational signal control means, constituted to condition the operational signal control means to pass such operational signal or completely block said operational signal corresponding to the presence or absence of the control signal. Said operational signal may be the audio translated and modulated signal from the sending station, or the electron gun strength control signal which excites the phosphor excitable surface or target of the kinescope of a television receiver, or other operational signal which produces an intelligible translation of the intelligence signals emitted from the sending station. I then also provide supplemental means, either in the form of a time-controlled prepay switching unit of coin controlled type, or in the form of a remote control element, which when activated provides a correcting signal, and connections between such supplemental means and the previously defined elements, whereby, when the control signal response element has caused the operational signal control means to block operation of the intelligence element which it operates, such blocking is terminated and the intelligible translation previously blocked is completely restored. Thus, either the audio translation or the intelligible picture translation is restored, as the case may be.

Other objects and uses of the invention will appear from a detailed description of the same, which consists in the features of construction and combinations of parts, hereinafter described and claimed.

In the drawings:

FIGURE 1 shows, more or less schematically, one system embodying features of my present invention, which embodiment includes means to emit radio signals according to either the A.M. or the F.M. system, or both simultaneously, for the same program; together with means to also emit a control signal, such as a super-sonic frequency signal, when such set is under pre-pay quality operation; together with means to receive and interpret either of the so-emitted sets of signals under selective use, including means to require the pre-pay or remote controlled function to be activated in order to intelligibly translate an audio reception of the "superior" quality when a special program is being emitted and it is desired to intelligibly receive and translate the same;

FIGURE 2 shows, also more or less schematically, another embodiment of features of my present invention, wherein three color dot array picture signals, and accompanying audio signals may be emitted, together with a super-sonic control signal, together with means in the receiving and translating equipment for cutting off the picture translation by suitable control of the kinescope guns, when a "superior" quality program is being emitted; and for restoring the operational functions of the guns when proper pre-pay or remote control has been made;

FIGURE 3 shows, more or less schematically, still another embodiment of features of my present invention, and receiving and translating equipment therefore operating on the single, gun, lineation principle, together with means to cut off the picture reception and translation when a "superior" quality program is being emitted, and means to restore such picture reception when proper pre-pay or remote control operation has been made.

FIGURE 4 shows another embodiment wherein the special signal comprises a frequency signal which may be an audio frequency, which, when received and translated and delivered to the speaker produces an interfering or undesirable noise without discontinuing the reception of the audio program; together with an "inverter" which, when activated, produces an exactly opposing frequency in opposing phase with the audio frequency produced by the control signal. Thus, when such inverter unit is activated the noise produced by the interfering wave is blanked out, to eliminate the interference with the audio program; together with pre-pay elements (either such as the coin-box or the remote control) for activating the inverter when pre-pay or remote control operation has been made;

FIGURE 9 shows an embodiment wherein the control signal effects change of television reception to monochrome reception, even when a color signal program is being emitted by the sending station, with provision for restoring color reception, based on such color signal program emission, when pre-pay or remote control operation has been made; and FIGURE 10 shows an embodiment, wherein the control signal acts to tie together all three of the electron guns of a three gun color television receiver, so that all three such guns are modulated simultaneously by the received signals, for production of white light when pre-pay or remote control has not been produced; with provision for restoring normal individual gun modulated operation for production of the color translation, when the pre-pay or remote control operation has been made.

Figure 1:
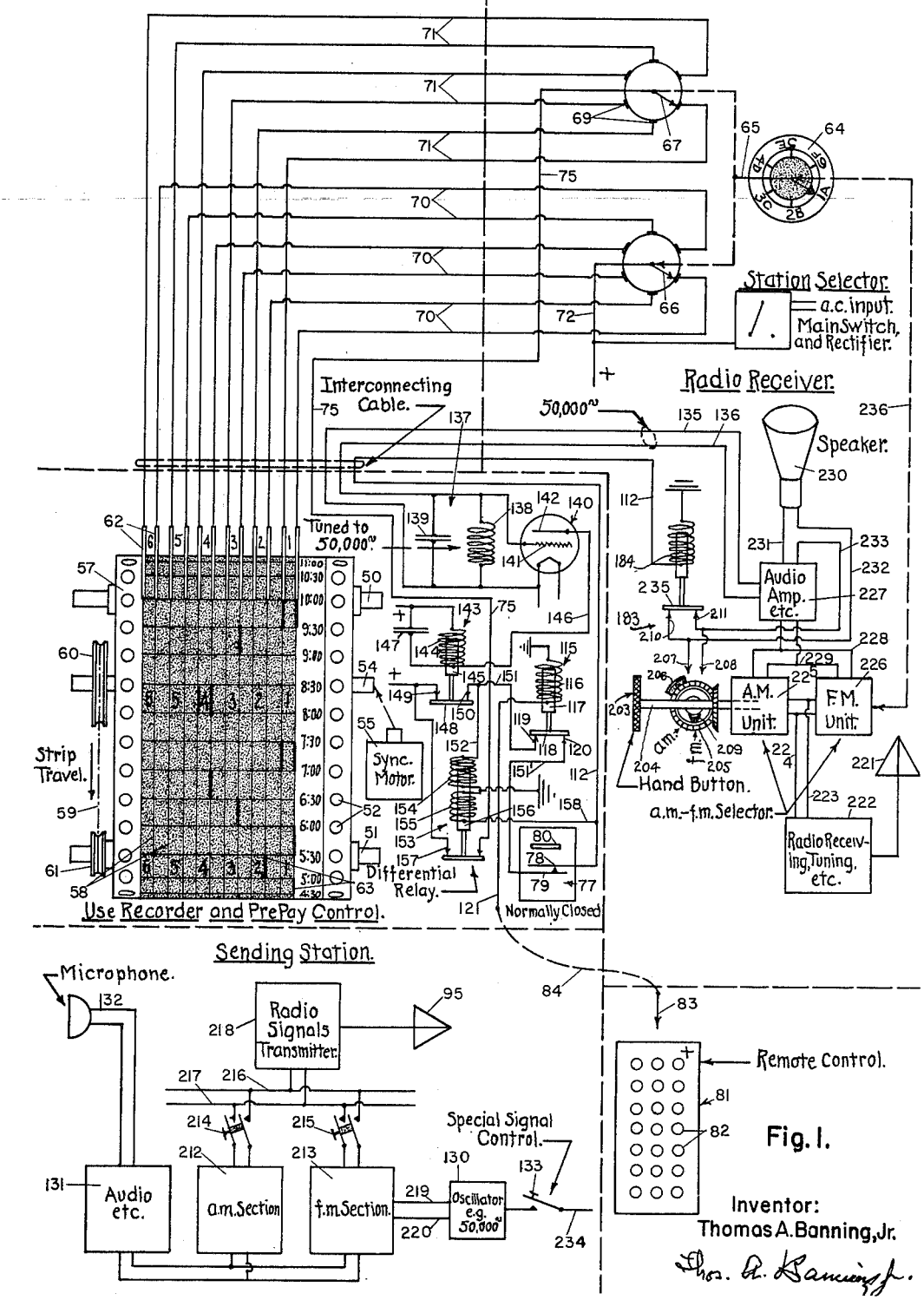

Referring to the schematic showing in FIGURE 1, I have shown the conventional microphone 132 connected to the conventional or modified audio unit 131 which is in turn connected to the A.M. section 212 and the F.M. section 213 so that the signals delivered by the section 131 corresponding to the audio from the microphone, are delivered from such sections 212 and 213 to the switches 214 and 215 respectively, as radio frequency signals on the A.M. basis and the F.M. basis respectively. Said switches connect to the radio signals transmitter 218 over the lines 216 and 217. Thus the radio frequency signals corresponding to either or both A.M. and/or F.M. are received by the radio signals transmitter 218 and delivered to the antenna 95 by which they are put onto the air. It is thus also noted that such signals emitted by such antenna may be of either the A.M. form or the F.M. form, or both of such forms of signals may be mixed in such unit 218 and delivered in such mixed form to the antenna for emission.

I have also provided an oscillator unit 130, fed over the line 234 under control of the switch 133, which oscillator may then deliver a pre-determined frequency control signal over the lines 219 and 220, to the F.M. section. In such section such pre-determined frequency signal is mixed with the radio frequency produced in such section 213, so that the signals delivered from such section 213 when the switch 133 is closed will include such pre-determined frequency control signal superimposed on the radio frequency signals of the F.M. type. Under these conditions the F.M. signals delivered to the antenna, when the switch 215 is closed will include such superimposed pre-determined frequency control signals. Conveniently, but not necessarily such control signal frequency may be in the super-sonic range, as for example 50,000 c.p.s, shown in the figure. It is to be noted however, that such control signals are included in the emitted signals from the antenna only when such control switch 133 is closed. Thus it is possible to emit either of five series of signals from the antenna; comprising A.M. alone, F.M. alone, A.M. and F.M. mixed, and A.M. and F.M. and control signal mixed, and F.M. and control signal mixed but without the A.M. This ability to intermix the two kinds of signals (e.g., A.M. and F.M.), with or without inclusion of the control signal, as detailed above may also be expressed as follows: The five series of signals include either a "superior" quality signal, or an "inferior" quality signal, or both the "superior" and "inferior" quality signals mixed, or both the "superior" and "inferior" quality signals and the control signal mixed, or the "superior" quality signal and the control signal mixed but without the "inferior" quality signal. I have thus mentioned the F.M. series of signals as being for the "superior" quality emission by way of illustration only.

The foregoing explanation concerns itself with the means which I have provided for emitting the several series of signals, either singly or as groups. The receiver and translating means are next considered as follows:

The speaker 230 is fed with the translated audio signals over the lines 231, 232 and 233 from the amplifier unit 227, under various controls. These include the switch element 183 having the stationary contacts 210 and 211, together with the movable switching contact 235. Such contact 235 is normally seated against the contacts 210 and 211 to close the circuit controlled by such elements, being the audio and other unit 227 already referred to, together with the speaker fed by such unit 227. The movable contact element 235 may be raised by the armature of the solenoid 184, when such solenoid is energized, thus interrupting delivery of audio frequency signals from such unit 227 to the speaker. Normally, however, such circuit is closed, being opened by raising of the contact 235 only under the control signal operations, presently to be disclosed.

The radio frequency signals are received by the antenna 221 and are then fed to the radio frequency unit 222 as shown. Such unit 222 delivers its amplified radio frequency signals to both of the A.M. and F.M. units 225 and 226 over the lines 223 and 224. These units 225 and 226 may be of conventional form for translating received radio signals of either the A.M. type (unit 225) or of the F.M. type (unit 226), into translated audio frequency delivered to the lines 228 and 229, depending on which type of reception is to be translated, and under control of the operator, according to conventional practice. Selection of the type of translation to be delivered to such lines 228 and 229 is effected by rotation of the shaft 204 which is schematically shown as connected to such units. Such shaft is conveniently provided with the control button or handle 203 by which it may be rotated for the desired selection of type of signals to be translated. Provision is also made for tuning to a selected band of signals of either the A.M. or the F.M. type, to select that station whose emitted signals are to be received and translated, according to conventional practice. The prime purpose of such handle and shaft elements is to enable selection of either the A.M. or the F.M. type of signal translation and audio production.

The shaft 204 drives a disk element 205 through the medium of bevel gears so that as such shaft is moved to either of its two positions (corresponding to A.M. translation or F.M. translation, respectively; such disk is also rotated to a corresponding position, for A.M. or F.M., as indicated by registry of the pointer 209 with either the A.M. or the F.M. marking shown in the figure. In the position shown, such shaft and disk have been rotated to the F.M. position.

Such disk carries the arcuate contact 206 which contact is however insulated from the disk. Such contact may engage both of the stationary contacts 207 and 208, bridging them together when the control button 203 is moved to the A.M. position. Such contacts connect respectively, to the lines 232 and 233. Therefore, when the selector control button 203 is moved to the A.M. position the contacts 210 and 211 are bridged, so that the continuity of the speaker circuit is maintained irrespective of the effect of energization of the solenoid 184. In other words, when the selector control button is moved to the A.M. position speaker operation may be produced by translation of arriving A.M. radio signals irrespective of arrival of control frequency signals (e.g., 50,000 c.p.s.). On the other hand, when the selector control button is moved to its F.M. position, under which condition the arcuate contact 206 does not bridge the contacts 207 and 208, the speaker circuit will be closed only under the condition that the movable contact 235 is not raised. Thus, energization of the solenoid 184 with corresponding rise of the contact 235 will produce opening of the speaker circuit, and corresponding disablement of the speaker system, even under the condition that a program is being received and translated under the F.M. system. It is thus evident that arrival of F.M. signals without intermixed or other control signals (e.g., 50,000 c.p.s.), will enable audio translation to be produced through the speaker; so that under the condition of absence of control signals in the arriving radio signals it will be possible to receive and translate the audio corresponding to such radio signals on the F.M. system.

To recapitulate, the so-far described equipment enables production of the following operations:

(1) Reception and translation audibly from received A.M. signals either with or without the presence of the control signal mixed into the radio frequency signals. These results are secured with the conventional tuner tuned to the proper station tuning position, and with the selector control button 203 moved to its A.M. translating position, and with the contact 235 either down (no control signal being included in the radio frequency signals), or up (such control signal being present intermixed with the radio frequency signals).

(2) Reception and translation audibly from received F.M. signals, but only under the condition that the contact 235 is down and engaged with the contacts 210 and 211. These results are secured with the conventional tuner tuned to the proper station tuning position, and with the selector button 203 moved to its F.M. position. Two possible further conditions must also be met to then secure audible translation of such received F.M. signals, as follows:

A. If the received F.M. signals also include intermixed control signals (e.g., 50,000 c.p.s.), then provision must be made for allowing the contact 235 to remain in engagement with the contacts 210 and 211, notwithstanding the presence of such intermixed or otherwise delivered control signal.

B. If the received F.M. signals do not include control signals, then the contact 235 will remain normally in engagement with the contacts 210 and 211 so that special provision need not be made for ensuring the engagement between such contacts.

Provision has been made for ensuring engagement of the contact 235 with such stationary contacts 210 and 211 under prepay or other suitable control even when the control signal may be emitted from the sending station and received at the tuning and translating station. Under such pre-pay or other condition the effects of the reception of the super-sonic control signal are neutralized and made ineffective. The means to effect these operations are as follows:

The unit 227 legended "Audio Amp., etc." includes a trap which will pass the control signals of the selected frequency delivered from the antenna, and pass such control frequency signals over the lines 135 and 136 to the oscillator 137 which includes the inductance 138 and the capacitor 139. One or both of these elements may be made adjustable, according to conventional practice, to calibrate the oscillator for resonant response at the control signal frequency. The electron tube 140 is shown in connection with the oscillator circuit with its grid 141 anchored to one side of the oscillator circuit so that when a sudden rise of potential occurs in that circuit, the grid will be correspondingly affected, and thus control the operation of the plate circuit of the tube, including its plate 142. This tube will have it filament heated at all times while the receiver is turned on for which purpose proper circuits, not specially illustrated are provided. Thus, whenever a program is emitted from the sending station, and the control frequency signal is included or otherwise delivered to the receiver circuits, such control frequency signal will be immediately brought to the oscillator 137, thus producing a condition under which the plate 142 may deliver current to another element or elements. Conversely, whenever a station is tuned without provision of such control frequency signal the effects just described will not occur.

The resonant response just explained is next communicated to other elements as follows:

A simple relay 143 is provided, having the solenoid 144 and the armature 145. One end of such solenoid is connected by the line 146 to the plate 142, and the other end of the solenoid is connected to the other side of the system. A capacitor 147 is connected across the solenoid to improve the operation, if desired. The movable contact 148 is brought into engagement with the stationary contacts 149 and 150 when the relay is energized, thus delivering current from the supply connection marked "+" to the line 151. This line connects to the stationary contact 119 of the relay 115, so that such contact 119 is electrified by the closing of the contacts of the relay 143 under the effects produced by the presence of the control frequency signal at the receiver. Thus, whenever such receiver is tuned to a program as to which the special control frequency signal is being emitted, such stationary contact 119 will be immediately electrified. The solenoid 116 of such relay 115 has one end grounded and its other end is connected by the line 121 and the flexible extension thereof, to the plug 83 which may be inserted into one of the sockets 82 of the plate 81 which is positively electrified, so that when such plugging occurs such relay 115 is energized and the movable contact thereof 118 is raised from the stationary contacts 119 and 120, thus opening the circuit of the line 151.

A continuation line 151' extends from the companion stationary contact 120 to one contact 79 of the coin box unit 77. The other contact 78 of such coin box unit connects to the line 112 which extends to one end of the solenoid of the relay 184, the other end of such relay solenoid being grounded. The coin box contacts are normally closed, as legended in the figure, but they are separated when a suitable coin is inserted into such box and will remain separated for a pre-determined time interval. The coin receiving slot of such coin box is shown at 80.

From the foregoing described arrangements it is seen that whenever the control frequency signal is being received at the tuned station current will be delivered over the circuit including the contacts 149, 148, 150, line 151, contacts 119, 118, 120, line 151', contacts 78 and 79, and line 112, to raise and hold raised the movable contact 235 of the relay solenoid 184, thus opening the speaker circuit and retaining it in non-operative condition as long as such control frequency signal is being received, and neither the coin box contacts nor the contacts of the relay 115 are open-circuited. Such open-circuiting will, however occur when either the coin box contacts are opened, or the contacts of the relay 115 are open-circuited by insertion of the remote control plug 83 into a selected one of the sockets of the plate 81. Thus, the operativeness of the speaker circuit may be effected either by coin box operation, or by remote control.

The tuning dial by which the desired sending station is radio frequency tuned is shown schematically at 64. It is there shown as including provision for tuning a selected one of six stations. The connection of such tuning element with the F.M. and A.M. units 226 and 225 is shown by the dashed line 236.

I have made provision for producing a record of the sending stations which are tuned at various times and brought into intelligible interpretations by such tunings of the receiving station in question. Such records also show the times of starting and stopping of the tunings to the signals emitted by the sending stations so tuned, and provide identification of the sending stations so tuned. Such records are of value in connection with various studies concerning tuned receptions of the various programs from the various sending stations at various times of day. Such records are also of value for purposes of accountancy, to ensure proper distribution of the gross proceeds taken by the pre-pay coin box (or records made at a central stations operating on the remote control principle), to the sending stations from which the recorded "superior" quality programs are emitted.

The recording means herein disclosed is substantially the same as such corresponding recording means shown in the various figures of such parent application, S.N. 597,950, (now Patent No. 3,070,652), already mentioned. Accordingly, I do not herein describe such recording means in detail. However, since such recording equipment is interconnected with the pre-pay or remote control elements specially disclosed herein, I shall next describe such interconnections, as follows:

I have provided the differential relay 153 having the two solenoids 154 and 155 acting on a common armature 156. These two solenoids are so connected into their circuits that when they are both energized their magnetomotive forces neutralize each other, zeroizing the flux; whereas whenever either of the solenoids is energized separately, flux will be produced to raise the armature. The line 75 connects to the movable contact 67 which engages the series of stationary contacts 69, and to one of the stationary contacts of the relay 153. The other stationary contact 157 of such relay connects to the source of current. Thus, as soon as the relay 143 rises due to the resonance effects of the special control signal arriving concurrently with the radio program being tuned, current will flow through the solenoid 154 of this differential relay; but at the same time current will flow through the solenoid 155 which is connected to the line 158 and thus to the line 112. In the showing of the figure the contacts of the coin-box and of the relay 115 are shown as closed, no pre-pay having yet been made, and the remote control element having not yet been activated by plugging the plug 83 into one of the electrified sockets. Accordingly the relay 153 will remain down, and current will not yet be supplied over the line 75 to the contact 67. Thus no recording will yet be made of use time for the program being received and translated by the setting of the switch contact 67, corresponding to the tuned sending station, it being here noted that the stationary contacts 69 which are engaged by the movable contact 67 connect to those needles of the recorder which are provided for the recording of the "superior" quality programs. Under these conditions, therefore no recording will yet be made of the "superior" quality program, and, since the selector switch element controlled by the button 203 was set to the F.M. receiving and translating position, the A.M. elements are not at this time energized, so that potential is not now present on the movable contact 66, and thus no recordings will be made of any "inferior" quality program being simultaneously emitted by the sending station in question. Thus, under these assumed conditions neither a "superior" quality program nor an "inferior" quality program will yet be recorded.

As soon as either the pre-pay operation or the remote control operation is produced the line 112 will be de-electrified the series circuit thereto having been opened either at the coin-box or the remote control relay 115. Thus the relay 153 will rise since the solenoid 155 has now been de-energized while the solenoid 154 remains energized, and potential will now be delivered over the line 75 to the contact 67. Due to the engagement of such contact 67 with the stationary contact which leads to the needle corresponding to "superior" quality reception at the tuning position of the receiver (which is the tuned position for such "superior" quality program), a recording of such program will be made as long as such tuning continues, while such program is being emitted by the sending station.

The following comments are pertinent respecting various operations produced by the foregoing disclosed equipment:

The relay 143 is normally in open circuit position, under which condition its movable contact 148 is lowered and no current may be supplied to the line 151. Such relay 143 is energized to raise its armature only when a control signal of the resonant frequency to which the oscillator 137 is tuned, is being received and is being transmitted over the lines 135 and 136 to the oscillator. Under the condition just stated (that the line 151 is not electrified), no current is delivered over the line 112 to the relay 184, so that the speaker circuit remains closed and operative. This is true whether an A.M. or an F.M. signalled program is being tuned and received at the receiver. Accordingly, under such condition of absence of the control signal either an A.M. or an F.M. may be transmitted and intelligibly translated at the receiver. The following further conditions are also present when such control signal is absent:

When such control signal is absent so that the relay 143 is non-energized, with consequent non-electrification of the line 151 no current is supplied to either of the solenoids 154 or 155 of the differential relay 153, so that such relay remains in open-circuited condition with its movable contact lowered so that the line 75 remains un-electrified. Accordingly, no potential will be delivered over such line, and through the contact 67 to that line 71 which connects to the recording needle corresponding to the tuned station and program. Thus no recording will be produced on the needle which corresponds to the pre-paid or remote controlled condition for a "superior" quality program. It is noted however, that under these conditions potential is being supplied over the line 72 to the contact 66 which is also engaged with that stationary contact which connects to the needle corresponding to the station now being tuned, so that a record of such tuned condition is properly made.

As soon as the control signal is present and received by the tuned position of the receiver, the relay 143 will be activated to raise its movable contact, thus electrifying the line 151. This will deliver current to both of the solenoids 154 and 155 of the differential relay 153 so that said relay will remain non-activated with its movable contact down. This will ensure continued non-electrification of the line 75 so that the recording needle which corresponds to the station now being tuned, for recording of a "superior" quality program, will not yet be electrified, and recording for such "superior" quality program will not occur. Furthermore, such electrification of the line 151 will also electrify the line 112 leading to the solenoid 184 (no pre-pay or remote control operation having been made), so that the speaker will be rendered non-operative, and will remain non-operative until a pre-pay or proper remote control operation, has been made. Thereupon the opening of the contacts 78 and 79 (coin-box), or 119 and 120 (remote control) will de-electrify the line 112, thus de-activating the relay 184 to restore operativeness of the speaker, and also de-electrifying the solenoid 155 of the differential relay, thus activating such relay (its solenoid 154 remaining electrified), and delivering potential to the line 75 to ensure proper recording of the pre-paid or remote controlled condition, and reception of the "superior" quality translation of the received program.

Figure 2:
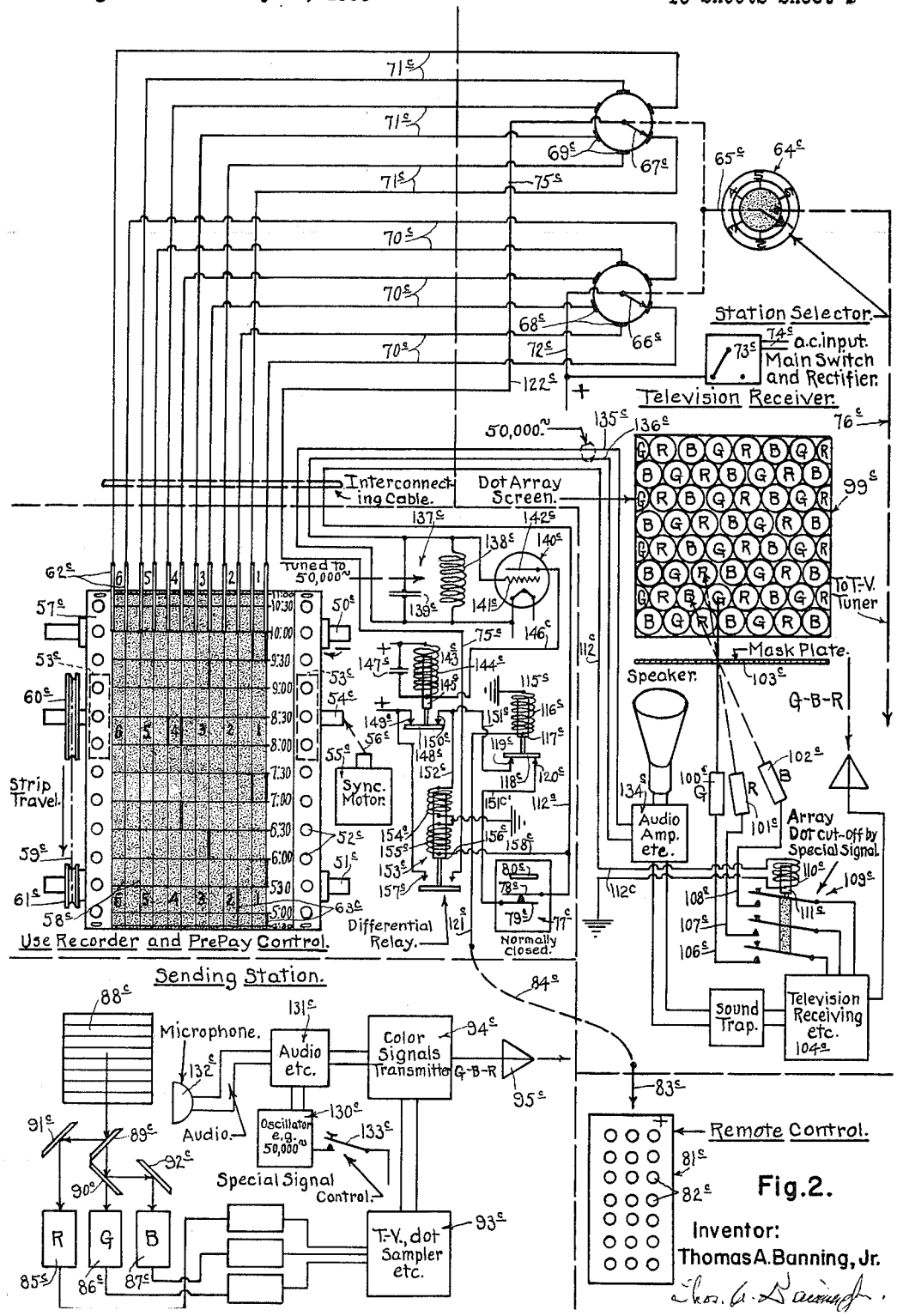
Figure 3:
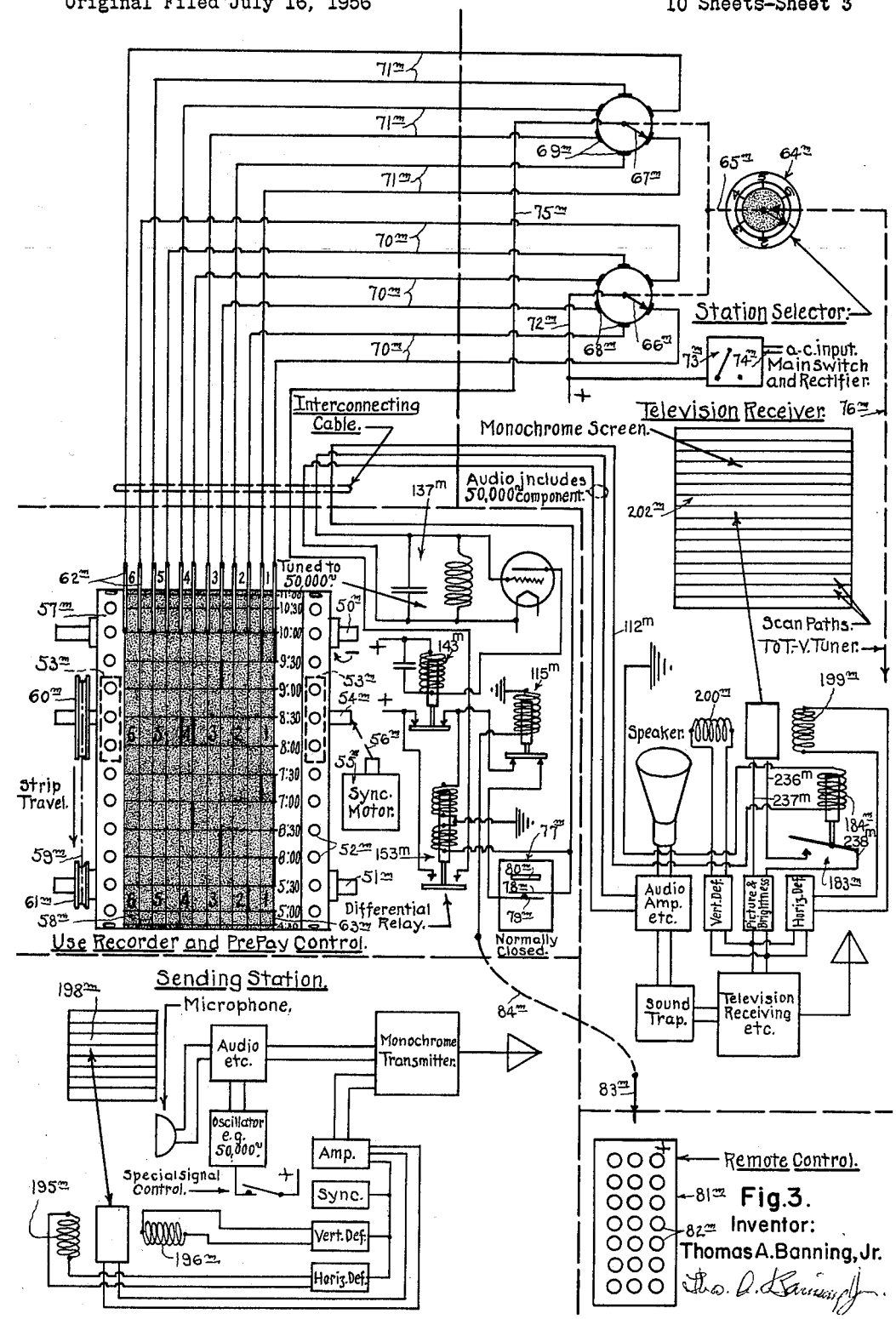

It is now noted that the embodiment shown in FIGURE 1 is one wherein the complete disablement of one factor or element of the intelligible translation is effected on an audio program reception. Also, that in such embodiment the other element of intelligible reception may be also an audio reception. In FIGURES 2 and 3 I have shown other embodiments of features of my present invention in each of which the two factors or elements of intelligible reception comprise a picture reception and translation, and a corresponding audio reception and translation. FIGURE 2 shows such an embodiment in which the picture reception and translation is on the three color dot array principle of operation, embodying three electron guns to effect proper excitation of the phosphor screen. FIGURE 3 embodies the use of an electron beam excitable screen or target which is provided with lineations of phosphors which will emit the three colors individually when such lineations are individually excited, so that by directing the electron beam to such lineations successively, and producing the conventional lateral deflections of such beam, each lineation will be excited separately, with production of illumination of color corresponding to the phosphor included in such lineation. This embodiment also includes a single gun which traverses such lineations in progressive succession over the entire raster area, by either a single field of passes or by two successive fields of passes one of which comprises an interlace field. Said FIG. 3 shows the screen 202$^m$ as legended "Monochrome Screen," since the operations already described may be incorporated in or with receivers operating on either the monochrome system or on the plural color system.

In the embodiment of FIGURE 2 I have provided means to control the delivery of beam strength signals to each of the three electron guns, thus enabling either operative functioning of all such guns for production of the desired color raster, or enabling disablement of operation of all of the guns to thus prevent production of a raster on the screen or target. In each such embodiment (FIGURES 2 and 3), I have provided a means which is constituted to selectively render the electron gun or guns operative or inoperative to enable production of the desired end result of either producing an intelligible raster, or of completely extinguishing such raster under such inoperative condition. Since such arrangements are also disclosed in tne said parent case, application Serial No. 597,950, patent No. 3,070,652, it is unnecessary to describe each of such FIGURES 2 and 3 in full detail here; but the following descriptions are presented for convenience of understanding of the embodiments of such figures.

In FIGURE 2 the three electron guns 100$^c$, 101$^c$ and 102$^c$ which excite the phosphor screen 99$^c$ are served by the lines 106c, 107c and 108c from the unit 104c legended "Television Receiving, etc." A three pole switch unit 109c is included in such lines 106c, 107c and 108c for controlling operativeness or inoperativeness of the guns. This switch is normally closed for ensuring normal operation of the guns under the condition of non-emitting and reception of the control signal. The solenoid 110c acts through its armature 111c to shift the switch into its open-circuit position, when the control signal from the sending station is received, no pre-pay or remote control operation having been made. To this end such solenoid receives its current over the line 112c under control of the circuitry which includes the resonant element 137c, the relays 143c, 153c and 115c and the various connecting lines shown in FIGURE 2, assuming that the control signal is being emitted by the sending station, and that no pre-pay or remote control has been made. Such pre-pay or remote control operation serves to discontinue electrification of the line 112c in the manner already explained in the description of FIGURE 1. It is noted that many of the elements shown in FIGURE 2 carry the same identification numerals as corresponding elements shown in FIGURE 1, but with the suffixes "c". Accordingly further detailed description of the embodiment shown in FIGURE 2 is unnecessary.

It is seen that whenever the control signal is being emitted from the sending station, no pre-pay or remote control having been made, the lines 106c, 107c and 108c are open, thus discontinuing operation of the electron guns, and discontinuing production of the replica raster on the viewing screen. The operation of pre-pay or remote control will then restore the switch 109c to its closed position, with production of the replica raster.

In the embodiment shown in FIGURE 3 there is provided a single electron gun which serves the parallel color or monochrome screen lineations of the kinescope for production of the three color or monochrome raster. This gun is served by the lines 236m, 237m and 238m under control of the switch unit 184m. Such switch unit is normally closed, but energization of the solenoid of such switch unit will draw its armature up, with corresponding open circuiting of the lines to the gun, and disablement of the gun operation. The line 112m which supplies current to the solenoid of the relay 184m is served by the electronic elements including the resonant unit 137m, the relays 143m, 153m and 115m, and the various connections shown in FIGURE 3. This control circuitry is the same as shown in FIGURES 1 and 2, and its elements are correspondingly identified by like numerals, but with the suffixes "m". Accordingly, it is unnecessary to describe such control circuitry in detail.

It is seen that whenever the control signal is being emitted from the sending station the line 236m is broken, thus discontinuing operation of the electron gun, and discontinuing production of the replica raster on the viewing screen. The operation of pre-pay or remote control will then restore the switch 183m to its closed position, with production of the replica raster.

Figure 4:
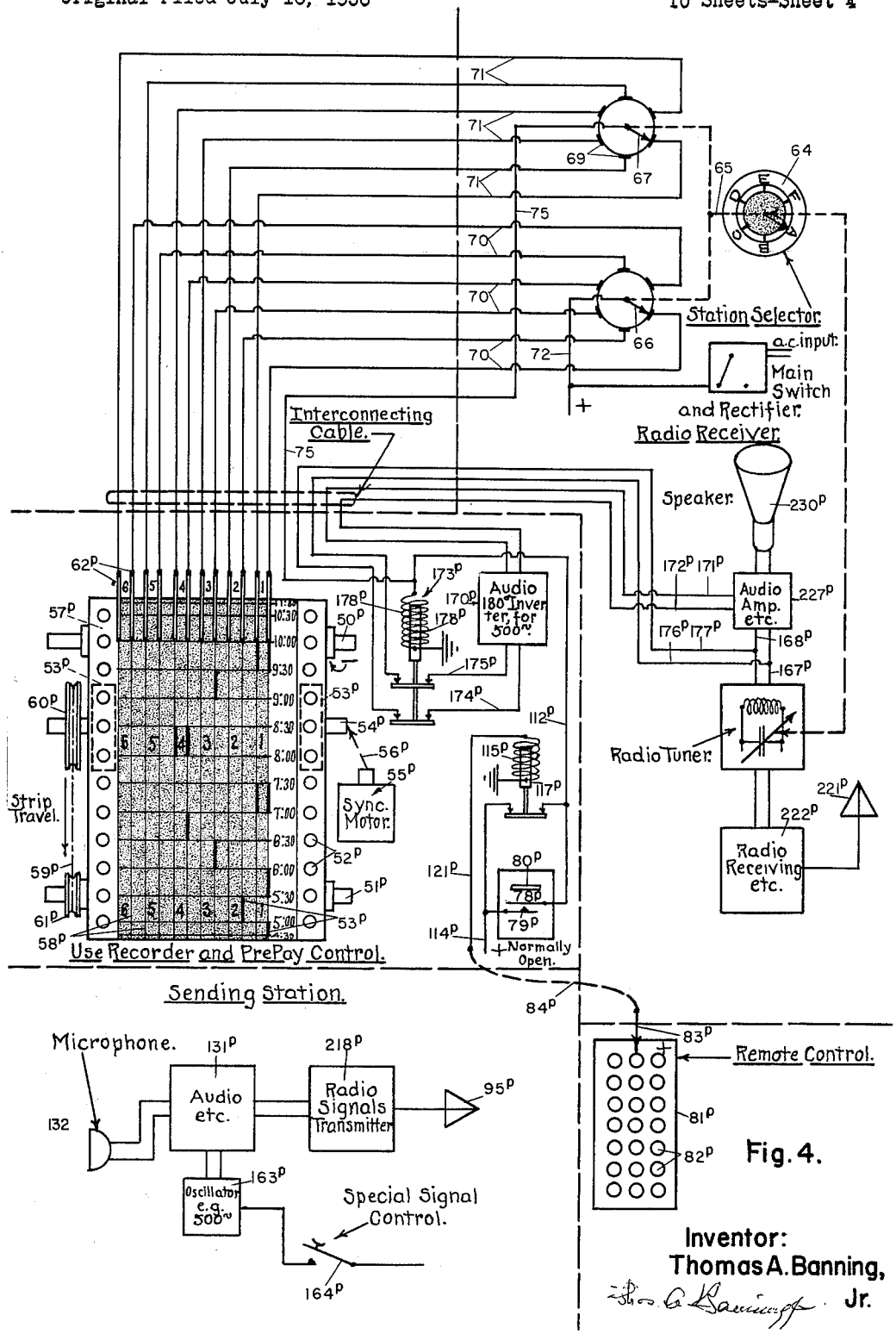
Figure 5:
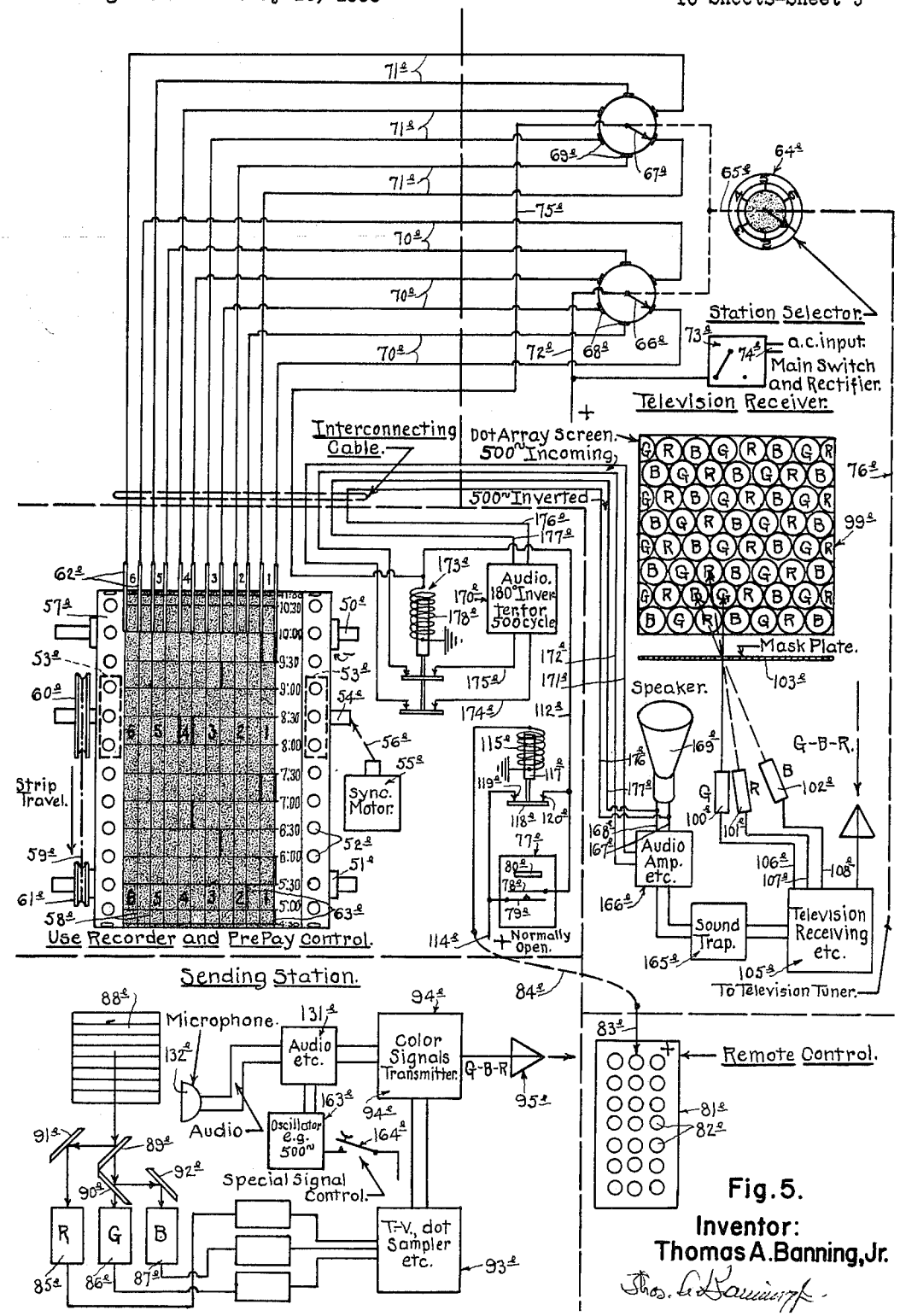
FIGURE 5 shows an embodiment similar to that of FIGURE 4, wherein such inverter controlled audio reception is combined with a television reception arrangement, wherein the television reception is based on the three color dot array principle.
Figure 6:
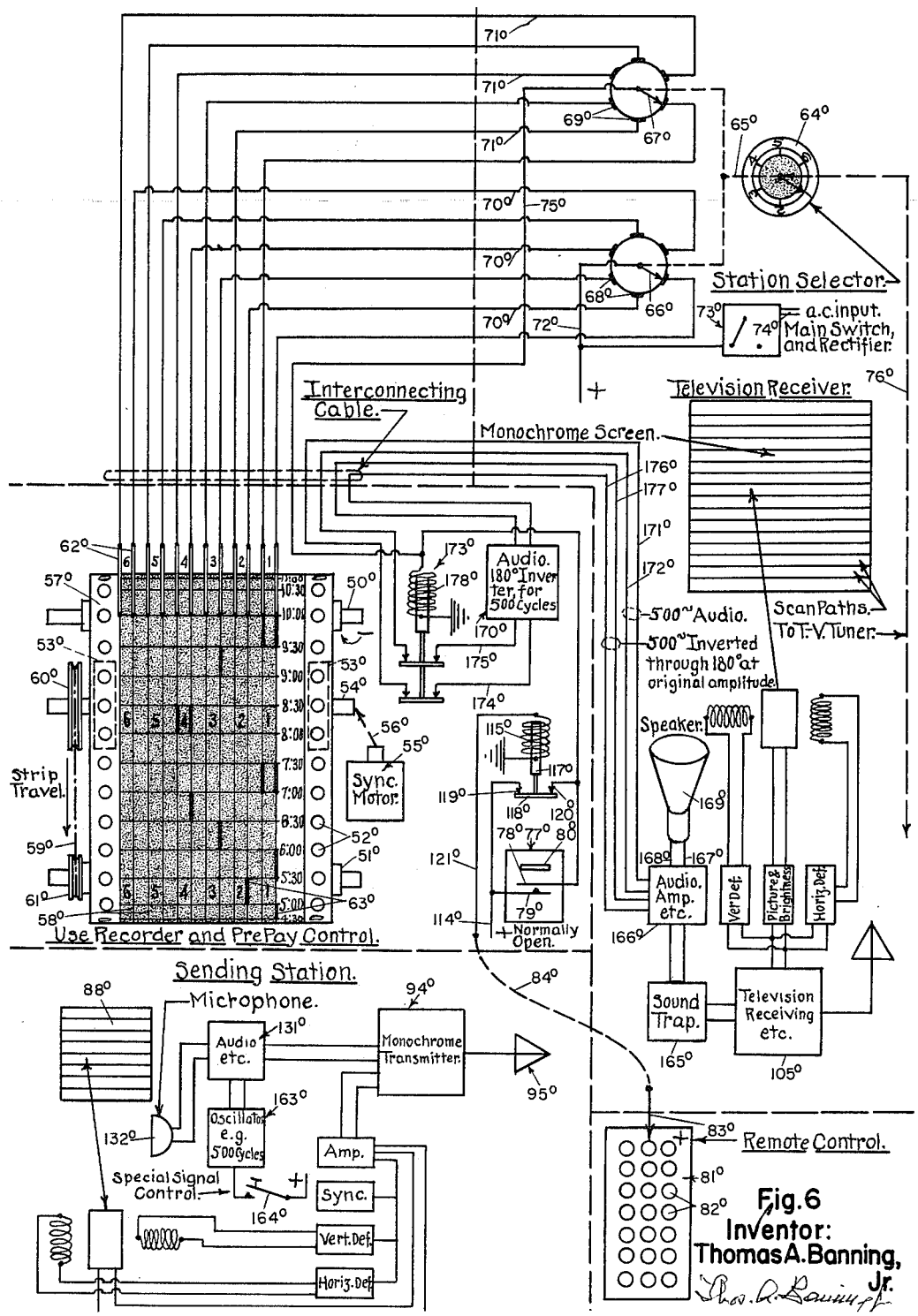
FIGURE 6 shows an embodiment similar to that shown in FIGURE 5, but wherein the television reception is based on the monochrome linear scan principle.

In each of FIGURES 4, 5 and 6 I have shown an embodiment in which a signal is emitted from the sending station, which signal is conveniently of frequency within the audible range (e.g., 500 c.p.s.). Such signal is received and translated to include such audible frequency in the audio received by the speaker, so that such relatively constant signal is heard superimposed on the translated intelligence signal, such as music. I then provide an inverter in the receiver, and connections between such inverter to carry the received and translated signal to the inverter, there to be translated and emitted as a directly inverted signal of the same frequency and strength as the signal received from the speaker circuit; and such thus emitted inverted signal is then fed back into the audio being transmitted directly to the speaker. Thus mixed with the audio being transmitted to the speaker such inverted signal will oppose and directly cancel the non-inverted signal, thus cleaning such signal from the audio delivered to the speaker, and allowing such speaker to deliver the translated program free of the signal, notwithstanding that such signal was emitted from or for the program sending station.

In FIGURE 4 such an arrangement is shown as applied to a radio program without inclusion of television translation. This figure therefore shows a simple radio tuning circuit delivering the de-modulated signals from the unit 227p to the speaker 230p. A branch line 176p–177p delivers a portion of such signals to the inverter 170p, under control of the two pole switch relay 173p. When such switch is closed the signals are delivered to the inverter over the lines 174p–175p; and the inverted signals are then delivered over the lines 171p–172p to junction with the unit 227p, from which the program audio is transmitted directly to the speaker without inclusion of the de-modulated control signals of (e.g. 500 c.p.s.).

The switch element 173p is controlled by the pre-pay unit or the remote control unit, as the case may be, according to the principles already explained in detail. The switch is normally open, but closes by the effect produced either by the pre-pay operation, or by the remote control operation. Thus, during reception of programs which do not include the control signal, no pre-pay is needed, but the program as de-modulated is sent directly to the speaker. When a pre-pay or remote control program is received, together with its control signal (the relay 173p being open due to non-payment of pre-pay or operation of the remote control), no inverter action is produced, and the signals sent to the speaker will include both the program as de-modulated, plus the control signal of audio frequency. Then, by pre-pay or remote control, the relay 173p will be raised, closing the inverter circuit, and cancelling out the audio effects of the control signal.

In FIGURE 5, I have shown an embodiment which includes a color television plus audio reception arrangement of conventional form, schematically illustrated. In this case the inverter arrangement is included in the audio side of the receiver circuitry, so that the operations of the speaker of the receiving unit are substantially the same as those already described in connection with FIGURE 4. The color transmission and reception and translation in FIGURE 5 are on the conventional three color dot array basis.

FIGURE 6 shows an arrangement similar to that shown in FIGURE 5; but in the embodiment shown in FIGURE 6 the color television emission, reception, and translation may be on the three color linear scan basis when the lineations emit primary colors when excited with use of a single electron gun in the receiver. The control signals act on the audio reception, and are cancelled out by the inverter in manner similar to that already explained in connection with FIGURE 4. The screen is legended "Monochrome Screen," the arrangement of FIG. 6 being usable with either color or monochrome operation.

FIGURES 7, 8, 9 and 10 show embodiments in which the control signal may be of super-sonic frequency, e.g., 50,000 c.p.s. Such signal, when received, acts through the agency of the oscillator 137 to control the relay 143 in manner already described herein. Such relay thence controls the differential relay 153 in manner already explained to pass a signal which will produce the desired disabling effect.

Figure 7:
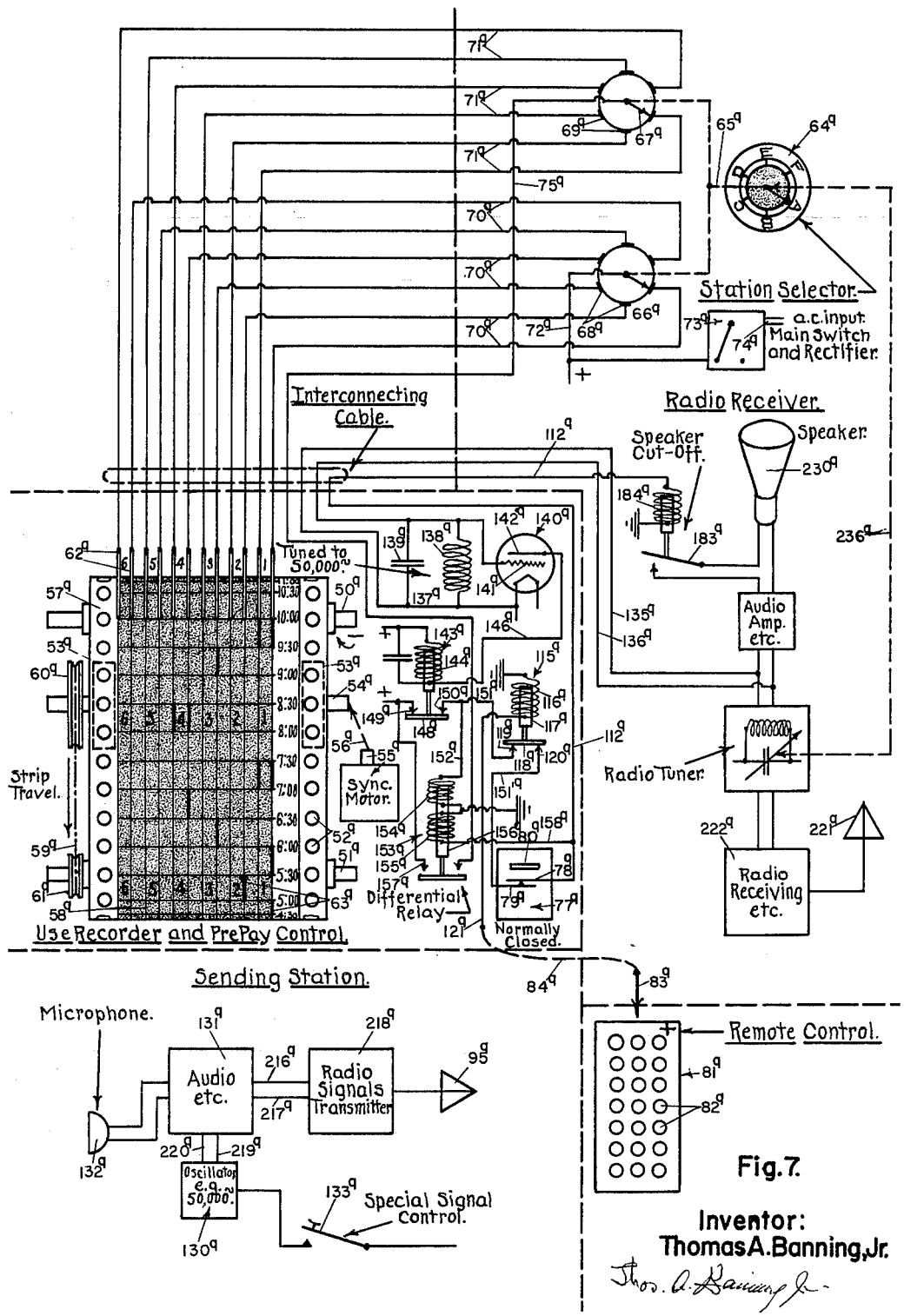
FIGURE 7 shows an embodiment including only the audio reception feature control, wherein the audio reception is discontinued upon reception of a super-sonic frequency, together with restoration of such audio translation and reception when pre-pay or remote control has been made.

In the embodiment shown in FIGURE 7 such disabling effect comprises the opening of the audio circuit to the speaker, until a pre-pay or a remote control operation is made, thus restoring the operation of the speaker.

Figure 8:
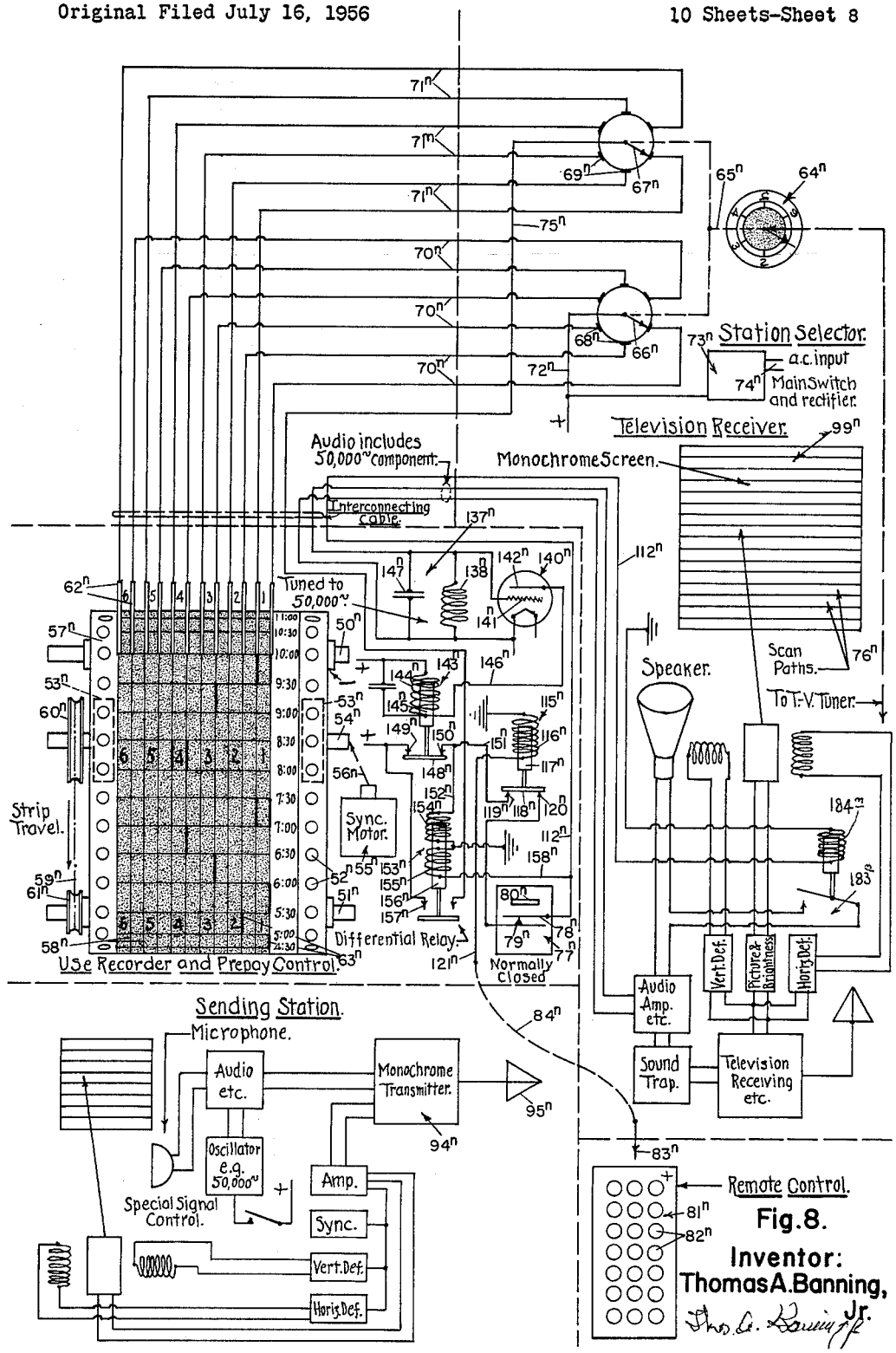
FIGURE 8 shows an embodiment similar to that shown in FIGURE 7, but wherein the audio reception control feature is combined with provision for television signals reception on the monochrome linear principle.

In the embodiment shown in FIGURE 8, the speaker circuit is affected in manner similar to that just explained, but in a television receiver of that type which produces the replica by electron beam scan of monochrome or three color lineations.

In the embodiment shown in FIGURE 9 I have made provision for shifting the scanning elevation of each scan slightly so that the scans may normally be produced on the color lineations but will be shifted to the intermediate monochrome scanning lines when the control signal is received, no pre-pay or remote control having been made. Then the pre-pay or remote control disables such shifting operation and restores the scans to the color lineations for production of the raster in full color. The slight sifting of the scans is produced by the coil 194$^j$ schematically shown close to the right-hand side of the raster in FIGURE 9.

In the embodiment shown in FIGURE 10, provision has been made for normally activating the three guns of a three gun color receiver of conventional form. A switch 162$^d$ is then provided under control of the solenoid 110$^d$, which when energized closes such switch, thus tying all three of the gun strength lines 159$^d$, 160 and 161$^d$ together so that all of the guns are simultaneously controlled for all received color components, producing a monochrome raster. Such coil is energized by receipt of the super-sonic control signal, so that such signal thus automatically causes the raster to be produced in monochrome. Then the pre-pay or remote control operation disables such energization of such coil 110$^d$, restoring the normal color reception on the three gun, three color dot array principle.

I claim:

1. In a signalling system, a sending station for the transmission of signals translatable to produce a program of intelligence, and a plurality of receiving stations each of which includes means constituted to receive signals so transmitted by the sending station and translate to the user of such receiving station said signals, which signals when translated produce to the user a first intelligible translation of said program, said receiving means including means in a control station remote from said receiving station, constituted to cause such receiving station to receive and translate to the user, the signals which when translated by the receiving station produce to the user a second and different quality intelligible translation of said same program, said control station including means to make operative or inoperative the means which is constituted to cause such receiving station to receive and translate to the user of such receiving station said program of different quality; wherein the control station includes means constituted to cause selected receiving stations to receive and translate to the users of such receiving stations, the signals which when translated by the receiving stations so selected produce to the users of said selected receiving stations a second and different quality intelligible translation of said same program, said control station including means corresponding to each such selected receiving station, to make operative or inoperative the means which is constituted to cause each such receiving station to receive and translate to the user of such station, said same program of different quality.

2. In a signalling system, a sending station for the transmission of signals translatable to produce a program of intelligence, and a plurality of receiving stations each of which includes means constituted to receive signals so transmitted by the sending station and translate to the user of such receiving station said signals, which signals when translated produce to the user a first intelligible translation of said program, said receiving means including means in a control station remote from said receiving station, constituted to cause such receiving station to translate to the user a second and different quality intelligible translation of said same program, said control station including means to make operative or inoperative the means which is constituted to cause such receiving station to translate to the user the second and different quality intelligible translation of said same program; wherein the control station includes means constituted to cause selected receiving stations to receive and translate to the users of such receiving stations, the signals which when translated by the receiving stations so selected, produce to the users of said selected receiving stations a second and different quality intelligible translation of said same program, said control station including means corresponding to each such selected receiving station, constituted to make operative or inoperative the means which is constituted to cause such receiving station to receive and translate to the user of such receiving station, said same program of different quality.

3. The structure as defined in claim 2; wherein the selected ones of said receivers are constituted to receive and translate received color signals in monochrome or color translation, selectively; together with means to cause said selected receivers to receive said color signals and translate the same in monochrome translation; and wherein the second or different quality of translation comprises color picture translation; and wherein the means in such control station corresponding to each such selected receiver station, which means is constituted to make operative or inoperative the means which is constituted to cause such receiving station to receive and translate to the user of such receiving station, said same program of different quality, is constituted to cause such receiver to receive and translate such so-received program in color.

4. The structure as defined in claim 2; wherein the program transmitted by the sending station includes both audio and video signals, and wherein each selected receiving station is constituted to receive and translate both of such audio and such video signals to produce an intelligible translation thereof to the user of such receiver; together with means constituted to cause each selected receiver to receive and translate only the audio signals during one intelligible translation; together with means in connection with such control station corresponding to each such selected receiver station constituted to cause selected receivers to receive and translate the video signals to produce an intelligible raster in such receivers; and wherein the different quality of translation comprises the production of intelligible translations of both the audio and the video received signals.

5. The structures as defined in claim 2; wherein the program transmitted by the sending station includes audio signals, and wherein each selected receiving station is constituted to receive and translate such audio signals to produce an intelligible translation thereof to the user of such receiver; together with means individual to each selected receiver, and under control of the sending station, constituted to forbid translation of such audio component of a pre-determined program, by such selected receiver; together with means in connection with such control station corresponding to each such selected receiver station constituted to cause selected receivers to receive and translate such audio signals to produce an intelligible program audio component; and wherein the different quality of translation comprises the production of such audio component translation.

6. The structures as defined in claim 5; wherein the program transmitted by the sending station also includes video signals comprising a portion of such program, and wherein each selected receiving station is constituted to receive and translate such video signals to produce an intelligible picture component to the user of such receiver.

7. The structures as defined in claim 2; wherein the signals which are translatable to produce a program of intelligence are audio frequency signals, including interfering signals within the audible range; wherein the means of each receiver which is constituted to receive the signals so transmitted by the sending station, including the interfering signals, and to translate to the user of such receiving station a first intelligible translation of said program, is constituted to receive and translate said audio signals including said interfering signals; each selected receiver including means to nullify such interfering signal, and including means to activate such nullifying means; and wherein the control station includes means constituted to make operative the activating means of selected receivers; wherein the second and different quality reception of the program is produced by such selected receivers.

References Cited by the Examiner

UNITED STATES PATENTS

| | | | |
|---|---|---|---|
| 1,911,091 | 5/1933 | Schriever | 332—17 X |
| 2,104,012 | 1/1938 | Armstrong | 343—200 |
| 2,709,254 | 5/1955 | Halstead | 343—200 |
| 2,755,334 | 7/1956 | Banning | 178—5.1 X |
| 2,965,433 | 12/1960 | Alpert et al. | 346—37 |
| 3,051,775 | 8/1962 | Novak et al. | 178—5.1 |
| 3,070,652 | 12/1962 | Banning | 178—5.1 |
| 3,070,798 | 12/1962 | Currey et al. | 346—37 |

DAVID G. REDINBAUGH, *Primary Examiner.*

STEPHEN W. CAPELLI, *Examiner.*